Sept. 16, 1924.
F. W. POWERS ET AL
PRESSURE EQUALIZING SHOWER MIXER
Filed March 16, 1923
1,508,938
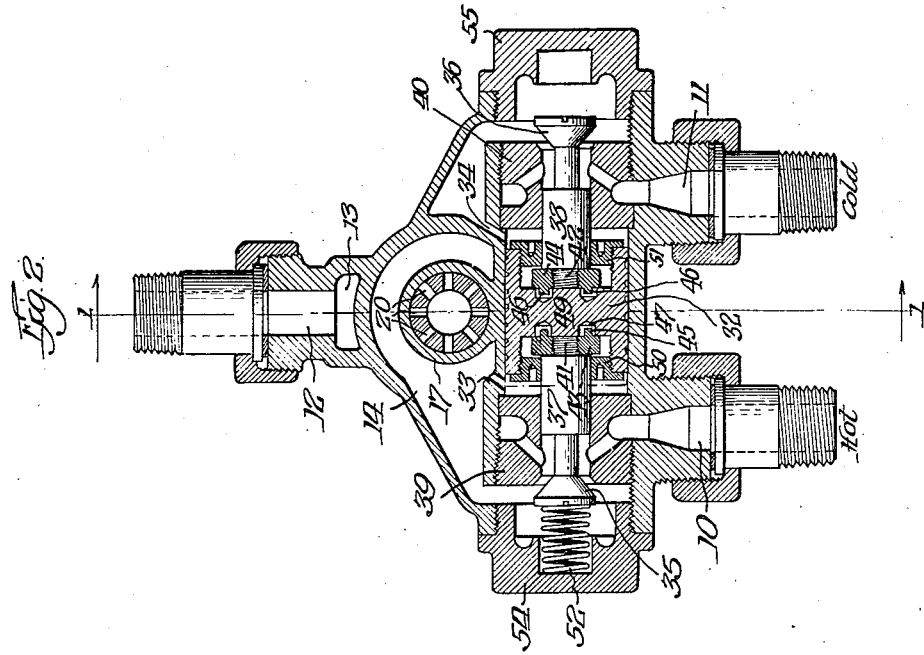
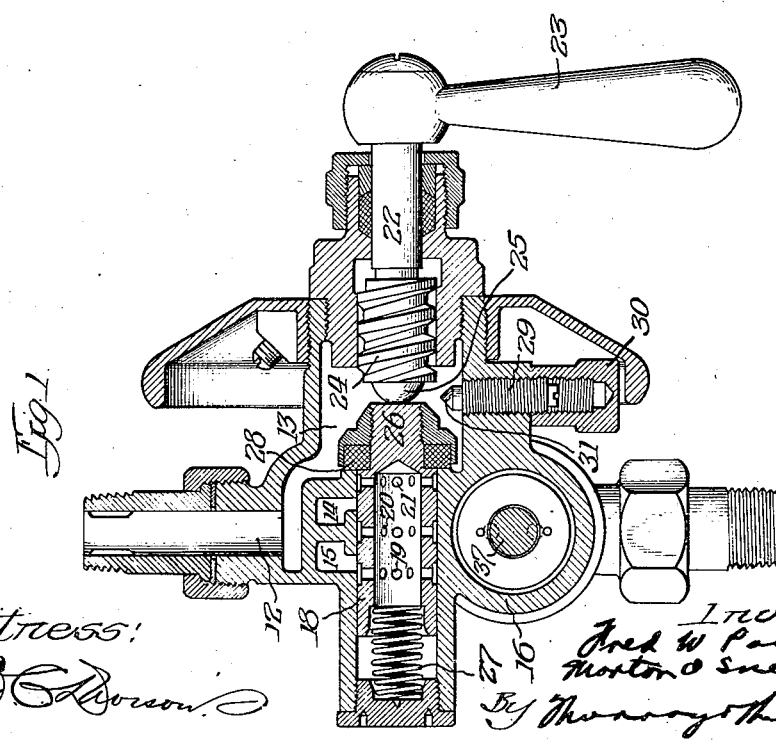

Patented Sept. 16, 1924.

1,508,938

UNITED STATES PATENT OFFICE.

FRED W. POWERS AND MORTON O. SNEDIKER, OF CHICAGO, ILLINOIS, ASSIGNORS TO THE POWERS REGULATOR CO., OF CHICAGO, ILLINOIS, A CORPORATION OF ILLINOIS.

PRESSURE-EQUALIZING SHOWER MIXER.

Application filed March 16, 1923. Serial No. 625,472.

*To all whom it may concern:*

Be it known that we, FRED W. POWERS and MORTON O. SNEDIKER, citizens of the Unitel States, and residents of Chicago, in the county of Cook and State of Illinois, have invented certain new and useful Improvements in a Pressure-Equalizing Shower Mixer, of which the following is a specification.

This application relates to devices such as described in the title hereof and is a continuation in part of our application Ser. No. 567,692, filed June 12, 1922.

One of the particular objects of our invention is to improve the form of pressure equalizing shower controllers, to apply certain safeguards thereto and generally render such devices more practical and efficient.

To that end we provide means in connection with the shower controller for limiting the extent of opening thereof and consequently limiting the temperature of the mixed liquids.

A further improvement relates to the construction of the mixing valve employed in the shower controller.

The invention will be better understood by reference to the accompanying drawing, wherein, Fig. 1 is a vertical, sectional view taken through a device constructed in accordance with our invention, the view being taken on the irregular line 1—1 of Fig. 2, and, Fig. 2 is a similar view taken at right angles to that of Fig. 1.

In the drawings it will be seen that we provide a casing having hot and cold water inlets 10, 11, respectively, a mixed liquid outlet 12, a chamber 13, for the mixed liquids, a chamber or passage 14, for the hot liquid and a chamber or passage 15, for the cold liquid. Provided as a part of the casing is the cylinder 16, within which the equalizing piston is mounted, and a cylinder 17, within which the controller valve is located. The valve indicated at 18 is of tubular, cylindrical form and is mounted for reciprocation within the cylinder 17. The valve is provided with a plurality of rows of radial apertures 19, 20, 21, the first mentioned serving to admit cold liquid, the second mentioned admitting hot liquid and the third mentioned discharging the two liquids into the chamber 13. A stem 22 adapted to be actuated by a handle 23, carries a threaded portion 24. The rounded end 25 of the stem abuts the projecting end 26, of the mixing valve and the valve is positively moved toward the closed position by the action of the parts just described. A spring 27 serves to move the valve outwardly when permitted by the operating stem. A sealing valve 28 is carried on the portion 26 of the mixing valve and when the mixing valve is in its extreme rearward position, the valve 28 is seated and escape of any liquid is prevented. It will be noted that the mixing valve is hollow and that the liquids in the chambers 14, 15, pass through the radial openings, then longitudinally and out through the radial openings 22. This provides a simple construction of maximum capacity.

It will be noted that the valve 28 is secondary in operation and serves only as a precautionary shut-off. The cylindrical valve member 18 is carefully fitted in the cylindrical valve passage and the liquids which are admitted through the radial openings which communicate with the supply passages, cannot escape except through the radial openings 21, and in the position shown in the drawings no cold liquid can escape even though the valve 28 be moved away from its seat, until the uncovering of the openings 21 begins.

The construction illustrated is of particular advantage in another feature, from the standpoint of manufacture. As stated, the tubular valve member is carefully fitted into the cylindrical seat and the separate valve actuating stem 22 is provided with relatively coarse threads carried in a threaded bonnet. By making the valve and the actuating member separate a nicety of fit of the valve member may be secured without any attempt to effect an accurate alignment with the screw-threaded bonnet which carries the actuating stem.

As a means for positively limiting the extent of opening of the mixing valve we provide a screw-threaded stop member 29, the adjusting head of which is covered by a cap 30. The projecting end 31 may be moved into the path of the head of the mixing valve and prevent its outward movement except to a pre-determined degree.

The projecting end being tapered as shown, provides for the necessary latitude of movement.

The pressure equalizing structure (as best shown in Fig. 2) comprises a piston 32, located in the cylinder 16, and adapted for free reciprocation therein. Ports 33, 34, provide communication between the chambers 14, 15, and the space at the heads of the piston. Valves 35, 36, are fixed to stems 37, 38, the stems sliding within heads 39, 40, which serve to close the ends of the cylinder. Passages in the heads permit the free discharge of water past the valves as permitted thereby. The stems 37, 38, have reduced threaded portions 41, 42, engaged by nuts 43, 44, said nuts having lateral projections or fingers 45, 46, on their outside faces, which projections register with depressions or recesses 47, 48, in the faces of the intermediate wall 49 of the piston. The nuts 43, 44, are somewhat larger in diameter than the stems 37, 38, and the nuts 50, 51, which surround the stems provide means for retaining the parts in the position shown in the drawings, the openings through the nuts being only slightly greater in diameter than the diameter of the stems 37, 38. The construction just described facilitates manufacture as it provides for certain allowable variations between the centers of the piston and the respective valves and stems.

It will be noted that the portion of the valve stems adjacent to the valves is materially reduced in diameter thus providing a shoulder opposed to the valve face and of similar area when the valve is in closed position. This serves to equalize the pressure which would otherwise tend to open the valve.

A spring 52 is mounted in the end cap 54 and serves normally to maintain the piston in a position in which the hot water inlet is closed in the event that the cold water supply is completely interrupted. This provision assures that in the event of a complete shut-off of the cold water no hot water will be delivered through the mixing valve. In normal operation, it being assumed that the entrance pressures of the hot and cold liquids are the same, the piston will remain in such position that both inlet ports are open. If, however, there is any fluctuation in the entrance pressures of either of the liquids it will be immediately indicated in the chambers 14, 15, and the greater pressure being exerted on the end of the piston will correspondingly close the entrance valve for said liquid of greater pressure and the pressure will therefore be instantly equalized in the two chambers 14, 15. This may or may not, in accordance with the construction provided, result in a lessened total volume of liquid flowing.

While we have herein referred to the use of the device in connection with hot and cold liquids it will be understood that steam may be utilized as the tempering element instead of hot water. It is, furthermore, unimportant if the steam pressure varies or is constantly at a pressure more or less than that of the cold liquid.

The device is capable of considerable modification and we do not wish to be limited except as indicated in the appended claims.

We claim:

1. In a device of the class described, the combination of a casing, means providing separate passages for hot and cold fluids, and a controlling valve of cylindrical tubular form a separate screw-threaded actuating member, said valve having a plurality of rows of radial openings positioned to be successively brought into register with said passages and said valve being provided with a plurality of additional radial openings adapted to provide for the passage of the combined fluids.

2. In a device of the class described, the combination of a casing, means providing separate passages for hot and cold fluids, and a controlling valve of cylindrical tubular form a separate screw-threaded actuating member, said valve having a plurality of rows of radial openings positioned to be successively brought into register with said passages and said valve being provided with a plurality of additional radial openings adapted to provide for the passage of the combined fluids, and a second valve movable with said controlling valve and adapted to close the passages against the escape of any liquid.

3. In combination, a casing, means providing separate inlet passages for hot and cold fluids and an outlet passage for the mixed fluids, a cylinder in said casing, a cylindrical tubular valve closely fitting said cylinder and having a plurality of circular rows of radial openings positioned to be successively brought into register with the cold and hot fluid inlet passages and also provided with a row of radial openings acting as discharge outlets and adapted to be uncovered upon the movement of the valve to a point at which said last named radial openings are outside of the limits of said cylinder.

4. In combination, a casing, means providing separate inlet passages for hot and cold fluids and an outlet passage for the mixed fluids, a cylinder in said casing, a cylindrical tubular valve closely fitting said cylinder and having a plurality of circular rows of radial openings positioned to be successively brought into register with the cold and hot fluid inlet passages and also provided with a row of radial openings acting as discharge outlets and adapted to be uncovered upon the movement of the valve to a point at which said last named radial openings are outside of the limits of said cylinder, and a flat valve fixed to the end of said cylindrical valve and adapted to seat against the end walls of said cylinder.

5. In combination, a casing, means providing separate inlet passages for hot and cold fluids and an outlet passage for the mixed fluids, a cylinder in said casing, a cylindrical tubular valve closely fitting said cylinder and having a plurality of circular rows of radial openings positioned to be successively brought into register with the cold and hot fluid inlet passages and also provided with a row of radial openings acting as discharge outlets and adapted to be uncovered upon the movement of the valve to a point at which said last named radial openings are outside of the limits of said cylinder, a separate screw-threaded valve actuating member for moving the valve in one direction, and a spring for moving the valve in the opposite direction.

6. In combination, a casing, means providing separate inlet passages for hot and cold fluids and an outlet passage for the mixed fluids, a cylinder in said casing, a cylindrical tubular valve closely fitting said cylinder and having a plurality of circular rows of radial openings positioned to be successively brought into register with the cold and hot fluid inlet passages and also provided with a row of radial openings acting as discharge outlets and adapted to be uncovered upon the movement of the valve to a point at which said last named radial openings are outside of the limits of said cylinder, a valve fixed to the end of said cylindrical valve and adapted to seat against the end walls of said cylinder, a separate screw-threaded valve actuating member for moving the valve in one direction, and a spring for moving the valve in the opposite direction.

7. In a shower controller, the combination of a casing, inlets for hot and cold fluids and an outlet for mixed fluids, a valve for controlling the mixing of said fluids, and pressure equalizing means mounted in said casing, said means comprising a piston, oppositely positioned valves movable with the piston, the respective ends of the piston being open to the pressures of liquids after having passed said valves, and means provided for limiting freedom of lateral movement in the connection between said valves and said piston.

8. In a shower mixer, the combination of a casing, a pressure equalizing piston therein, oppositely positioned valves axially arranged relative to said piston, and means in the connection between said valves and piston permitting limited freedom of movement transversely of the piston.

9. In a mixing valve, the combination of a casing, a pressure equalizing piston, a valve and valve stem axially arranged and projecting from each end of said piston, and a connection permitting limited freedom of movement between the valve stems and the piston.

10. In a shower mixer, the combination of a casing providing a cylinder, a pressure equalizing piston in said cylinder, recessed plugs providing valve seats and acting as cylinder heads, valves adapted to cooperate with said seats, valve stems projecting through the heads and connected to said piston, said valve stems being constructed to balance the pressures exerted on said valves.

11. In a shower mixer, the combination of a casing providing a cylinder, a pressure equalizing piston in said cylinder, recessed plugs providing valve seats and acting as cylinder heads, valves adapted to cooperate with said seats, valve stems projecting through the heads and connected to said piston, said valve stems being constructed to balance the pressures exerted on said valves, and means providing a connection permitting limited freedom of movement between the valve stems and piston.

12. In a shower mixer, the combination of a casing, a reciprocable mixing valve adapted to successively uncover first the cold and then the hot fluid ports, and an adjustable stop adapted to project into the path of movement of the valve port, and to limit the extent to which the hot fluid ports are uncovered.

13. In a shower mixer, the combination of a casing, a reciprocable mixing valve adapted to successively uncover cold and hot fluid ports, and a limiting stop adjustable by movement at right angles to the line of reciprocation of said valve and adapted to be positioned to limit the degree of uncovering of the hot fluid ports.

14. In a mixing valve, the combination of a casing, a valve adapted to successively uncover cold and hot fluid ports, a screw-threaded actuating member for moving said valve in one direction and a spring for moving the valve in an opposite direction, and an adjustable stop acting to limit the outward movement of the valve independent of the movement of the actuating member.

Signed at Chicago, Illinois, this 13 day of March, 1923.

FRED W. POWERS,
MORTON O. SNEDIKER.